(12) United States Patent  (10) Patent No.: US 7,387,445 B2
Swainson  (45) Date of Patent: Jun. 17, 2008

(54) BEARING HOUSING

(75) Inventor: Richard J Swainson, Derby (GB)

(73) Assignee: Rolls-Royce plc, London (GB)

( * ) Notice: Subject to any disclaimer, the term of this patent is extended or adjusted under 35 U.S.C. 154(b) by 218 days.

(21) Appl. No.: 11/144,636

(22) Filed: Jun. 6, 2005

(65) Prior Publication Data

US 2006/0002645 A1    Jan. 5, 2006

(30) Foreign Application Priority Data

Jun. 30, 2004  (GB)  ................................ 0414619.7

(51) Int. Cl.
*F16C 33/66* (2006.01)
(52) U.S. Cl. ...................................... 384/462; 184/11.2
(58) Field of Classification Search ................ 384/462, 384/465–467, 473, 474; 184/11.1, 11.2
See application file for complete search history.

(56) References Cited

U.S. PATENT DOCUMENTS

| 1,230,815 | A | * | 6/1917 | Smith | ......................... 184/11.2 |
| 1,352,298 | A | * | 9/1920 | Mears | ........................ 184/11.2 |
| 4,344,506 | A | | 8/1982 | Smith | |
| 4,422,821 | A | | 12/1983 | Smith | |
| 4,525,995 | A | | 7/1985 | Clark | |
| 4,576,001 | A | | 3/1986 | Smith | |
| 4,630,711 | A | * | 12/1986 | Levrai et al. | ............... 184/6.12 |
| 4,683,714 | A | | 8/1987 | Thebert | |
| 5,261,751 | A | | 11/1993 | Heinz | |
| 5,489,190 | A | | 2/1996 | Sullivan | |
| 6,286,476 | B1 | | 9/2001 | Hiraoka et al. | |
| 6,996,968 | B2 | | 2/2006 | Peters et al. | |
| 2006/0037302 | A1 | | 2/2006 | Peters et al. | |
| 2006/0037325 | A1 | | 2/2006 | Peters et al. | |
| 2006/0081419 | A1 | | 4/2006 | Care et al. | |

FOREIGN PATENT DOCUMENTS

JP      A 09-296735      11/1997

\* cited by examiner

*Primary Examiner*—Thomas R Hannon
(74) *Attorney, Agent, or Firm*—Oliff & Berridge, PLC

(57) ABSTRACT

A bearing housing 1 is designed to accommodate a bearing 4 within its outer walls 3. The bearing 4 upon rotation generates a centrifugally dispersed oil spray from its peripheral edge 7 and this spray is collected upon a facing surface of the wall 3. An out-take 6 has a relatively wide chordal arc opening across which a baffle 8 is presented such that there is a spaced opening 10 between a leading edge 9 of the baffle and a portion 3a of the housing 1. In such circumstances oil is scavenged from adjacent to the inner surface of the wall 3 in order to facilitate oil flow through the bearing 4 and out of the housing 1 such that it has a reduced residence time within the bearing 4/housing 1 and so is less susceptible to temperature induced degradation.

7 Claims, 1 Drawing Sheet

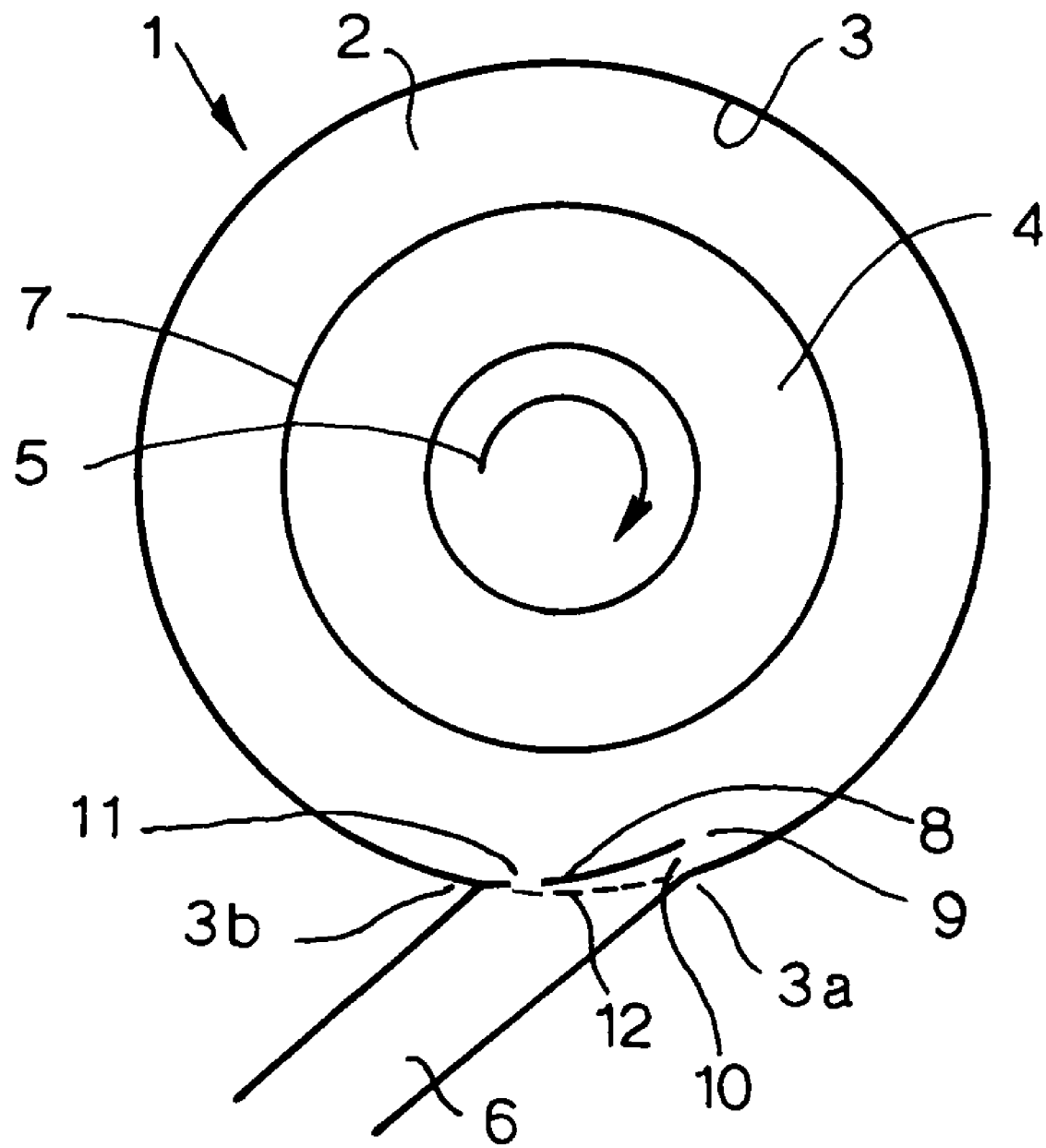

BEARING HOUSING

BACKGROUND

The present invention relates to bearing housings and more particularly to bearing housings incorporating an out-take for oil scavenging in order to achieve better oil regulation within a bearing.

Operation of bearings is well known and generally comprises bearing components appropriately lubricated and cooled by an oil. This oil is injected appropriately and presented to the bearing as required. Clearly, it is desirable to achieve an acceptable level of oil flow through the bearing rather than create long residence times for that oil within the bearing. It will be understood that long residence times will inevitably allow heating of the oil and therefore cause degradation of that oil as well as higher temperatures for the bearing itself.

In order to achieve good oil flow through a bearing, it is common practice to provide some form of oil scavenging. Oil scavenging involves creating a bias towards oil flow through the bearing. One way of creating that bias is utilising the centrifugal forces of rotation of a bearing such that oil is scattered from an outer peripheral edge of the bearing. This scattered oil may be collected in a volute such that utilising gravity or the centrifugal draft effect of bearing rotation or a specific vacuum pump biases flow towards a scavenge out-take is achieved.

SUMMARY

Clearly, if the centrifugal draft effect of bearing rotation is to be utilised then provision of a relatively wide chordal arc opening in a casing for the bearing may create pressure loss problems. In such circumstances, previously a single radial scavenge out-take has been utilised at or near the bottom dead centre of the housing. In such circumstances the scattered oil collects in a sump action towards that scavenge out-take. In such circumstances the out-take does not take full advantage of the inherent bearing rotation centrifugal forces to facilitate oil scavenging.

In accordance with the present invention there is provided a bearing housing comprising a chamber with out-take for oil scavenging, the out-take extending across a chordal arc of the chamber and a baffle extending across that out-take whereby a radial spaced opening is provided between the baffle and a portion of an outer wall of the chamber adjacent to the leading edge of the baffle.

Normally, the portion of the outer wall adjacent to the baffle has a spiral divergence. Typically, the baffle is aligned for consistency with the circumference of the chamber.

Generally, a drain is provided in the baffle. Normally, the drain is near to the mounting end of the baffle to the chamber wall.

Possibly, the baffle is displaceable to vary the radial spaced opening. Typically, the baffle is displaceable by pivot at the mounting end of the baffle to the chamber wall.

Also in accordance with the present invention there is provided a bearing arrangement incorporating a bearing housing as described above and a bearing arranged in use to rotate in order to spray oil by centrifugal effect towards the outer wall of the housing.

BRIEF DESCRIPTION OF THE DRAWINGS

FIG. 1 is a schematic view of a bearing housing in accordance with the invention.

DETAILED DESCRIPTION OF EMBODIMENTS

An embodiment of the present invention will now be described by way of example and with reference to the accompanying drawing of a schematic bearing housing in accordance with the present invention.

A bearing housing 1 is depicted in the drawing. This housing 1 comprises a chamber 2 having an outer wall 3 about a bearing 4 which rotates in the direction of arrowhead 5. The housing 1 incorporates an oil scavenge out-take 6 positioned generally at the bottom dead centre of the housing 1 but angled to take account of the centrifugal draught effect provided by rotation of the bearing 4 in the direction of arrowhead 5. It will be understood as described previously, rotation of the bearing 5 will generally throw off or spray oil from an outer peripheral bearing surface 7 and this dispersed oil will be propelled towards the outer wall 3 of the chamber 2. Generally, the surface of the wall 3 towards the bearing 4 will normally incorporate a volute in order to accommodate that oil spray and to prevent potential back splash or flow towards the bearing 4 which may ingress into the bearing inhibiting good oil flow and therefore performance in terms of temperature and lubrication as well as degradation of the longer residing oil within the bearing 4.

In accordance with the present invention, a baffle 8 is provided across the chordal arc presented by the out-take 6. The baffle 8 generally extends inwardly of the chamber 2 in order to create a radially spaced opening 10 between a leading edge 9 and a portion 3a of the outer wall 3. It will be appreciated that collected oil sprayed and incident within the volute or upon the simple surfaces of the wall 3 will pass through the spaced opening 10 into the out-take 6 for normal collection and processing as required.

By use of the baffle 8 it will be understood that the centrifugal draft force created by rotation of the bearing 4 in the direction of arrowhead 5 is more substantially maintained with less pressure loss as a result of the opening of the out-take 6. Similarly, if the out-take 6 is coupled to a vacuum pump the effect of that pump is limited to the cross-sectional area of the opening 10 and therefore is generally more focused.

Nevertheless, it will be understood that as a result of the opening 10 there is a localised pressure loss immediately after that opening 10 and so an inner surface of the baffle 8 is generally more susceptible to oil collection as a result of that effect and simple gravitational sump collection. In such circumstances a drain hole 11 is provided towards the bottom or mounting end of the baffle 8 in order to allow that collected oil to also become entrained in the scavenged oil passing through the out-take 6.

Generally the outer wall 3 of the chamber 2 will be of a slight spiral cross-section such that the wall portion 3a has a spiral divergence from a circular cross-section or circumferential alignment with the opposing part 3b of the housing 1. It will be appreciated that typically the portion 3b is also the position upon which the baffle 8 is mounted.

The baffle 8 will normally be held in a fixed position within a housing 1. Thus this position will define the spaced opening 10 and therefore the effective scoop of the out-take 6 with respect to scavenged oil within the cavity 2. Generally, the baffle 8 may be in circumferrial alignment with the wall 3 about part 3b or slightly within that circumferal line shown by broken line 12 in the drawing. Alternatively, the baffle 8 may be displaceable in order to vary the spaced opening 10 as required by particular operational circumstances with respect to the bearing 4. Displacement may be about a pivot between a mounting end of the baffle 8 upon the outer wall part 3b.

It will be appreciated in addition to scavenging oil from their bearing 4, the present invention also allows scavenging of oil as a film upon the inner surface of the wall 3 of the chamber 2. It will be understood that this wall oil film removes heat from the chamber walls and so can be detrimental. In such circumstances by use of the present baffle 8 it is possible to keep that oil film moving and scavenging back for collection and processing as required with a reduced residence time in the chamber 2. In general it is important to keep the oil flowing in order to avoid degradation by its exposure to high temperatures.

It will be understood that the particular shape, angle and curvature of the baffle 8 will be determined by particular operational requirements of the invention within different sized and shaped bearing housings. Nevertheless, in deciding on the shape, angle and curvature of the baffle 8, generally the objective will be to avoid oil re-circulating in the chamber 2 rather than being forced out of the scavenge out-take 6. By judicious choice of the shape in particular of the baffle 8, it is possible to direct the oil and oil/air mix close to the wall 3 into the scavenge out-take 6.

In addition to providing a further means for drainage of oil, the drain 11 may be needed to allow any oil that fails to be directed into the off-take 6 by the baffle 8 to still be drained out of the chamber 2 particularly when the bearing 4 is not operational, that is to say is not rotating in the direction of arrowhead 5 and at such times as shut down of a machine incorporating the bearing 4 and housing 1. Finally, in choosing the particular design shape for the baffle 8, it should be understood that the baffle 8 will generate a low pressure region at the top of the scavenge out-take pipe 6 such that oil and air flows into that pipe 6. Again, as described previously, the baffle 8 may be fixed dependent upon suspected operational requirements or the baffle displaceable in terms of particularly its directional angle relative to the out-take 6 in order to enhance oil/air flow into the off-take 6.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. A bearing housing comprising a chamber with out-take for oil scavenging, the out-take extending across a chordal arc of the chamber, and a baffle extending across the out-take, the baffle being attached to the chamber wall at a mounting end, whereby a radial spaced opening is provided between the baffle and a portion of the outer wall of the chamber adjacent to a leading edge of the baffle, wherein the portion of the outer wall adjacent to the baffle has a spiral divergence.

2. A housing as claimed in claim 1, wherein the baffle is aligned for consistency with the circumference of the chamber.

3. A housing as claimed in claim 1, wherein a drain is provided in the baffle.

4. A housing as claimed in claim 3 wherein the drain is near to the mounting end of the baffle to the chamber wall.

5. A housing as claimed in claim 1, wherein the baffle is displaceable to vary the radial spaced opening.

6. A housing as claimed in claim 5 wherein the baffle is displaceable by pivot at the mounting end of the baffle to the chamber wall.

7. A bearing arrangement incorporating a bearing housing as claimed in claim 1 and a bearing arranged in use to rotate in order to spray oil by centrifugal effect towards the outer wall of the housing.

* * * * *